United States Patent [19]

Schulte

[11] Patent Number: 4,653,763

[45] Date of Patent: Mar. 31, 1987

[54] ONE RUNNER SKI SLED WITH OUTRIGGERS

[76] Inventor: Eugene L. Schulte, 2104 Bluebonnet Dr., Apt. 112D, Hurst, Tex. 76053

[21] Appl. No.: 828,888

[22] Filed: Feb. 13, 1986

[51] Int. Cl.⁴ .................... B62B 13/04; A63C 1/18
[52] U.S. Cl. ..................... 280/12 KL; 280/12 K; 280/12 L
[58] Field of Search ............ 280/12 KL, 12 K, 12 L, 280/21 A, 27, 23, 15, 21 R, 87.04 A

[56] References Cited

U.S. PATENT DOCUMENTS 3,098,247  7/1963  Stein et al. .................... 280/12 F
4,108,452  8/1978  Baron ........................... 280/87.04 A

FOREIGN PATENT DOCUMENTS 64811  4/1913  Switzerland ................ 280/12 KL

Primary Examiner—John J. Love
Assistant Examiner—Donn McGiehan
Attorney, Agent, or Firm—Glenn K. Robbins

[57] ABSTRACT

A sled having a ski as a main runner and a pair of side or outrigger skis for stability. An arched tubular frame located fore and aft connects cross-wise the main runner to each of the side runners and supports a wooden deck at the top. A pair of arched struts connect the fore and aft frame. The side runners are provided with a pivot for tilt stability and a height adjustment for varying snow conditions. To maintain the rider on the sled the deck may be provided with a Velcro covering to stick to a Velcro band or apron worn by the rider.

13 Claims, 7 Drawing Figures

ONE RUNNER SKI SLED WITH OUTRIGGERS

BACKGROUND OF THE INVENTION

In the past the conventional sled for downhill recreational coasting has been constructed of a steel frame employing a pair of hollow ground steel runners and a wooden deck. While such sleds have enjoyed long standing popularity, they bog down in deep show and are best suited for snow that is packed. It has long been a problem for obtaining a suitable sled for such deep snow operation that is strong, yet light in weight such that it may be operated by children as well as adults.

Various types of sleds employing a main runner as well as outrigger runners have been proposed. Such sleds have generally been provided with raised seats or the like and are unsuitable for the rigors involved in downhill "belly flop" coasting where the rider lays down flat on the sled.

SUMMARY OF THE INVENTION

By means of this invention there has been provided a ski sled that may be used in relatively deep snow in the same manner as a conventional sled having a pair of steel runners and a body supporting deck. The ski sled has a single main runner in the center and a pair of outrigger or side runners to provide stability and turning or precise maneuverability by changing body weight position.

A unique tubular aluminum arch cross frame is employed to anchor the central main ski runner to the outrigger runners. A separate arch cross frame is used for each of the outrigger runners and support a longitudinally running body supporting deck. A longitudinally running bowed or arched strut support also is employed to connect the bowed cross frames above the outrigger runners and support a deck cross-brace at the middle of the deck. By means of the bowed tubular aluminum strut, maximum strength and flexing upon impact may be achieved while maintaining a light weight obtained by the use of wooden skis and deck.

A further feature of the invention employs a pivot connection between the outrigger skis and the arched or bowed cross frame. In this manner coasting upon uneven terrain or the impact and unevenness encountered in the launching operation may be readily accommodated. A height adjustment is also provided for elevation and lowering of the outrigger skis with respect to the main ski permiting adjustment for varying snow conditions.

As a further feature to facilitate body stability and staying on the sled while coasting the body of the sled may be slightly concave or cupped cross-wise of the deck. This provides a trough-like configuration aiding the rider in staying on the sled should it rock from side to side while coasting. In addition, the deck may be provided with a Velcro-like covering and the rider may wear bands or a tight apron of Velcro for literally sticking to the sled.

The sled of this invention is simply constructed of tubular aluminum and wood or like materials to provide a strong, rugged and light weight structure. It is simply employed and may be used in the manner of a conventional sled without the requirement of any special training or skill.

The above features are object of this invention. Further objects will appear in the detailed description which follows and will be otherwise apparent to those skilled in the art.

For the purpose of illustration of this invention a preferred embodiment is shown in the accompanying drawing. It is to be understood that this is for the purpose of example only and that the invention is not limited thereto.

IN THE DRAWING

DESCRIPTION OF THE INVENTION

Figure 1:
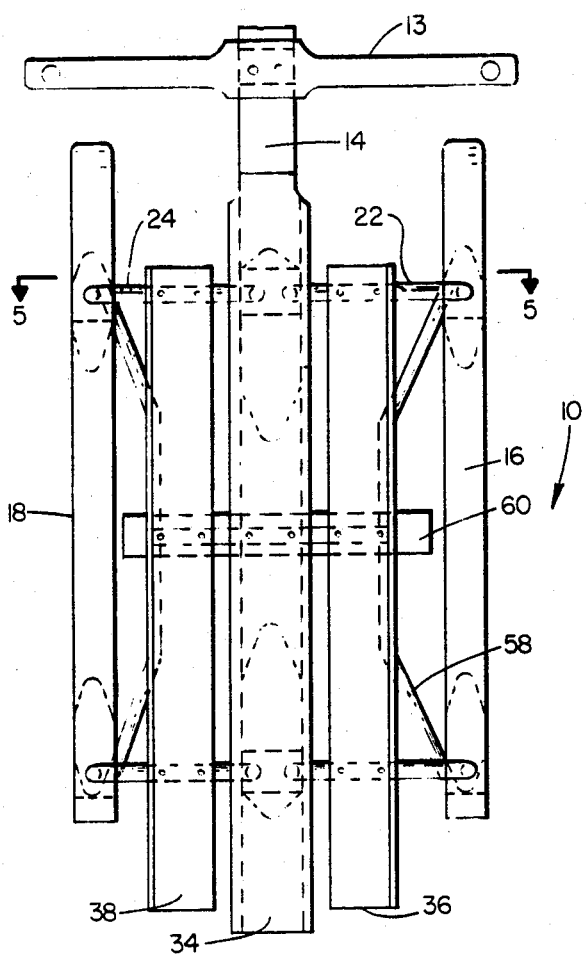
FIG. 1 is a top plan view of the sled.

The ski sled of this invention is generally indicated by the reference numeral 10 in FIGS. 1, 2, 5 and 6. It is comprised of, as its main elements, a deck 12, a handle bar 13, a central main ski 14, outrigger or side skis 16 and 18 and a supporting frame 20 for supporting the deck upon the skis.

Figure 2:
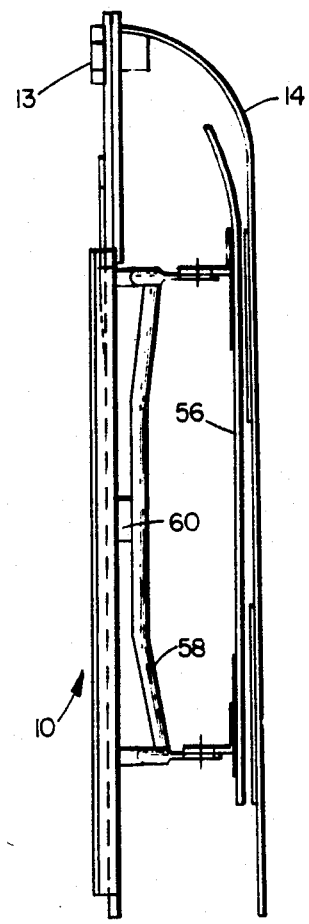
FIG. 2 is a view in side elevation taken from the right side of FIG. 1.
Figure 5:
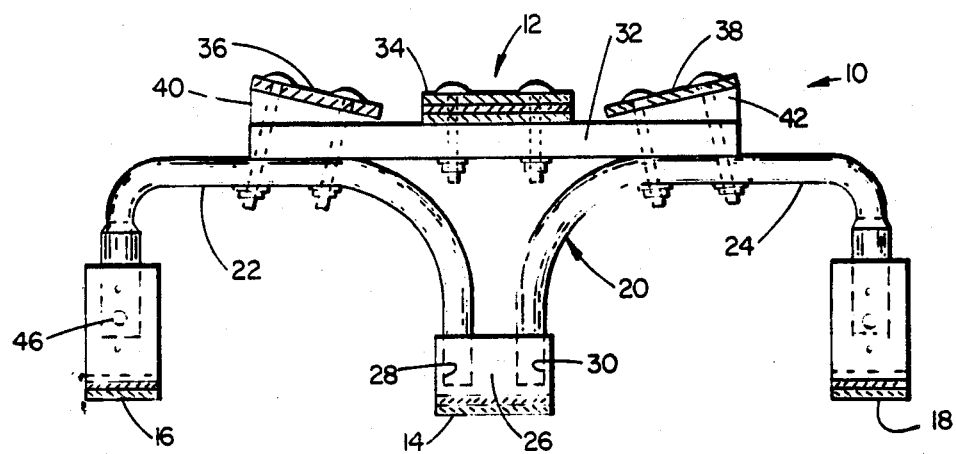
FIG. 5 is an enlarged view in section taken on the line 5—5 of FIG. 1.

The frame 20 is comprised as best shown in FIGS. 1, 2 and 5 of bowed or arched tubular cross frames 22 and 24 which connect the main ski 14 to the outrigger skis 16 and 18, respectively. A wooden anchoring block 26 glued or otherwise affixed to the main ski, is provided with openings 28 and 30, anchoring ends of the two cross frames to the center ski or runner by glue or conventional bolts if needed (not shown).

The arched cross frames further support at a top crown portion a wooded cross-brace 32. The brace supports the deck 12 which is comprised of a center slat 34 and side slats 36 and 38 positioned over the crown portion of the arched frames 22 and 24 for optimum stress distribution. The center slat 34 is connected at the front to an upturned portion of the main ski 14 to provide strength to the deck and the main ski. Wedges 40 and 42 are employed to tilt the side slats and provide a trough-like configuration for efficient body retention. Bolts are employed to connect the main ski frames to the brace and the outrigger skis through the wedges, the cross-brace and the crown portion of the tubular arched frames. The frame structure is further provided with a rear arched tubular frame and cross-brace, as shown in FIGS. 1 and 2, which is identical to that described for the front frame and the same reference numerals are applied.

Figure 3:
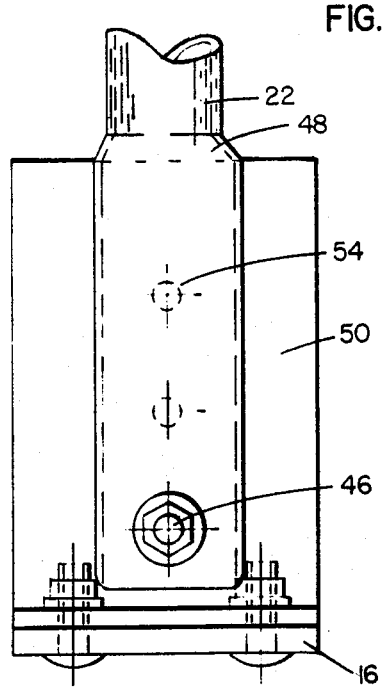
FIG. 3 is an enlarged fragmentary view in rear elevation showing the pivotal support for the side runner and height adjustment.
Figure 4:
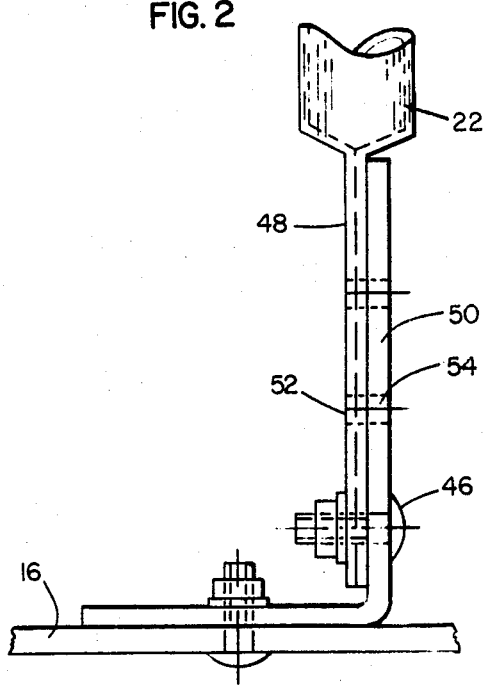
FIG. 4 is a view in side elevation similar to FIG. 3 taken from the right side of FIG. 3.

The ends of the arched cross frames 22 and 24 are affixed to the outrigger skis 16 and 18 as best shown in FIGS. 3, 4 and 5. The connection provides for a slight pivot movement of the outrigger skis through an arc as well as height adjustment. The pivotal connection is of a pivot pin 46 connecting a flattened end 48 of each of the arched cross frames to an L-shaped angle iron support 50 anchored to each of the outrigger skis. The end 48 of the arched cross frame is provided with a plurality of openings 52 which are registrable with a plurality of openings 54 in the angle iron support to receive the pivot pin in varying positions of height adjustment simply by resetting the pivot pin as desired.

An outrigger ski tubular strengthening brace 56 for each of the outriggers may also be provided as shown in FIG. 2. This may have a flattened end provided with holes (not shown) and be attached to the base of the angle iron supports 50 previously described. Where desired the strengthening outrigger brace 56 and the front and rear angle iron supports 50 may also be made integral by flattening the ends of the brace 56 and bending them to the angle iron configuration.

A pair of further longitudinal bowed tubular struts 58 is also provided rigidity to the front and rear arched cross frames and support a middle portion of the deck 12. The support 58 is used on both sides of the sled and is best shown in FIGS. 1 and 2 where it is shown fixed at its opposite ends to an upper portion of the front and rear arched cross frames above each of the outrigger skis. A wooden cross-brace 60 is attached to a crown portion of the two struts 58 and extends laterally underneath the middle portion of the deck and is connected by bolts to each of the center and side slats making up the deck.

The unique tubular frame structure is employed to produce a light weight sled where all components of the sled are load bearing to produce structural integrity of the unit. The arched cross frames 22 and 24 resist direct body weight upward and downward loads are carried through the cross frames 22 and 24 to the cross-brace 32 which keeps the cross frames from spreading. Slats 36 and 38 and deck 12 stabilize the front and rear cross frames through a center cross-brace 60 which is attached to struts 58. The struts 58 stabilize the front and rear cross frames from front and rear forces. The struts 58 further transfer about 30–50% of the riders body loads to the front and rear cross frames. These loads are reacted or absorbed by the outrigger skis in tension loads.

Figure 6:
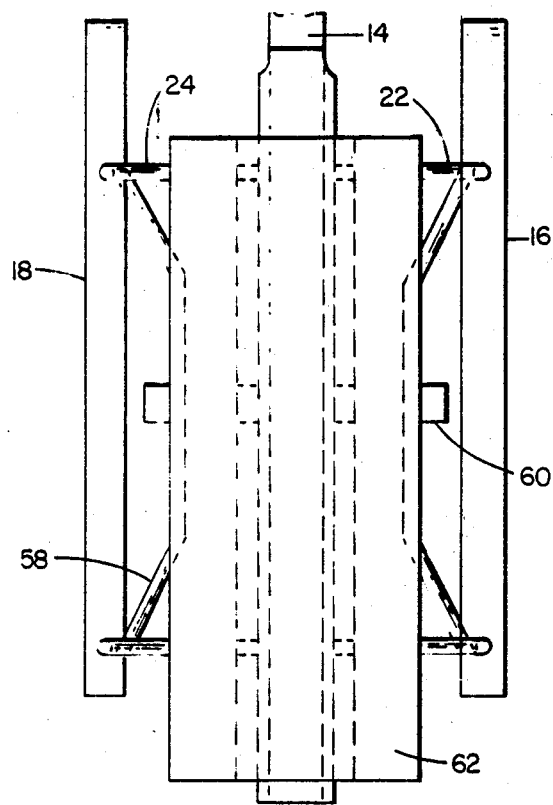
FIG. 6 is a top plan view similar to FIG. 1 showing the sled deck covered with a Velcro-like material.

FIG. 6 shows the covering of the deck 12 of the sled with a Velcro-like covering 62. An apron 64 has a body portion 66 covered by a mating Velcro-like material and a plurality of tie strings 68 for wrapping the apron to the body. The Velcro-like self-gripping material, which forms no part of this invention, per se, may be as in Velcro U.S. Pat. Nos. 2,717,437; 3,000,384 and 3,009,235. When the user of the sled lies flat upon the deck of the sled he is held snugly thereupon by the well-known mating of the Velcro-like coverings and stability against rolling off the sled is enhanced. Also, body weight shifts on sled may be precisely directed.

USE

The ski sled 10 of this invention is very simply employed. The outrigger skis 16 and 18 are first ajusted to the desired elevation whether this be level with the main ski or elevated thereto. This is accomplished by the adjustment of the pivot pin 46 in the registering holes 52 and 54 of the end of the arched cross-brace and the upstanding portion of the angle iron support 50 on the outrigger skis. Should it be desired to lock the outrigger skis against pivotal movement two pins may be employed instead of one.

The sled is then ready for use. It may be used as any coasting sled on downhill coasting or may be towed by attaching a tow line to the front handle bar 13 or to the two front arched cross frames 22 and 24. In downhill coasting the rider may in the standing position grasp with both hands the front handle bar 13 or use the arched strut 58 as a handle and then hurl himself downhill in the prone position. The concave trough-like body configuration of the deck 12 aids in body stability upon the sled both in the launching, coasting and maneuvering modes.

The outrigger skis 16 and 18 provide for better coasting in relatively deep snow conditions as compared to the conventional sled with a pair of narrow steel runners. The provision for height adjustment accommodates different snow conditions while the pivotal action of the outrigger skis facilitates coasting in terrain that may vary as well as snow conditions and depth of varying parameters.

Figure 7:
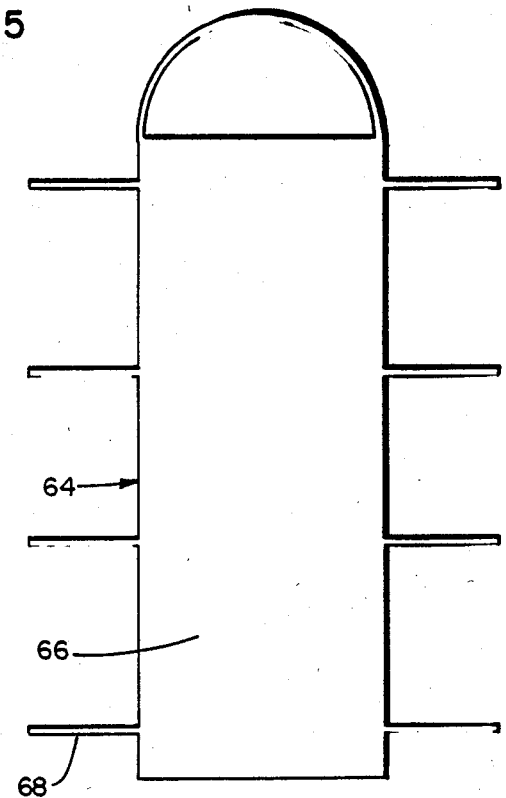
FIG. 7 is a top plan view of a body garment having a Velcro-like material for use in the sled operation.

The tubular arched construction throughout the frame further provides a strong rugged and light weight sled. This aids greatly to withstand the forces and stress placed upon and main and outrigger skis which must withstand the shock provided in the launching operation as well as the coasting mode. A degree of flexibility is also provided which augments the flexing characteristic of the wooden deck and main and outrigger skis.

Where desired the Velcro-like material 62 covering the deck may be employed along with the Velco-like apron 62 of FIGS. 6 and 7. While the trough-like configuration of the deck 12 aids in body stability and retention the use of the Velcro-like material further enhances the ability of the rider to stay on the sled and avoid being thrown.

Various changes and modifications may be made within this invention as will be apparent to those skilled in the art. Such changes and modifications are within the scope and teaching of this invention as defined in the claims appended hereto.

What is claimed is:

1. A ski sled comprising a main central ski and a pair of outrigger skis and a frame connecting said skis to a body support deck, said frame comrpising a pair of front and rear arched tubular cross frames, each pair comprising separate arched frames connected at one end to said main ski and at the other end to an outrigger ski and means for supporting said deck upon an arch portion of each of said arched cross frames.

2. The ski sled of claim 1 in which a pair of arched tubular longitudinal struts are employed to provide rigidity to the cross frames and support a medial portion of said deck.

3. The ski sled of claim 2 in which each of said longitudinal arched struts are connected to said front and rear arched cross frames and have a crown portion connected to a medial portion of said deck.

4. The ski sled of claim 1 in which said deck has a longitudinal trough shaped configuration to facilitate body support and the means for supporting the deck comprises a cross-brace supported upon the aforementioned arch portion of each of the frames and said deck comprises a horizontal main slat supported upon said cross-brace and side slats on opposite sides of said main slat supported on said cross-brace and slanting downwardly toward said main slat.

5. The ski sled of claim 1 in which said arched cross frames have a portion extending laterally beyond opposite sides of said deck and downwardly to a connection with said outrigger skis to provide stability against tilting and to provide for the front cross frames a hand grasping portion.

6. The ski sled of claim 1 in which the deck is covered with a Velcro-like material adapted to mate with a corresponding Velcro-like body apron garment worn by the user of the sled and placed in contact therewith when the user places himself prone upon the deck of the sled.

7. A ski sled comprising a main central ski and a pair of outrigger skis and a frame connecting said skis to a body support deck, said frame comprising a pair of front and rear arched tubular cross frames, each pair comprising separate arched frames connected at one end to said main ski and at the other end to an outrigger ski and means for supporting said deck upon an arch portion of each of said arched cross frames and pivot means for each of said outrigger skis at ends of said arched cross frames.

8. The ski sled of claim 7 in which said pivot means comprises a flattened end of each of said arched cross frames provided with a pivot pin fitting through an upstanding support fixed to each of the outrigger skis.

9. The ski sled of claim 7 in which means are provided for locking said outrigger skis against pivotal movement.

10. The ski sled of claim 7 in which each of said outrigger skis is provided with height adjustment means for varying the height of said outrigger skis with respect to said main ski.

11. The ski sled of claim 10 in which said pivot means comprises a flattened end of said arched cross frames provided with a pivot pin fitting through an upstanding support fixed to each of the outrigger skis and a plurality of registering holes are provided in the flattened ends of the cross frames and the upstanding support to receive the pivot pin in selected positions of height adjustment.

12. The ski sled of claim 11 in which means are provided for locking said outrigger skis against pivotal movement comprising a pair of pivot pins received in registering holes of the flattened end of the cross frame and the upstanding support to lock the same together against pivotal movement.

13. A ski sled comprising a main central ski and a pair of outrigger skis and a frame connecting said skis to a body support deck, said frame comprising a pair of front and rear arched tubular cross frames, each pair comprising separate arched frames connected at one end to said main ski and at the other end to an outrigger ski and means for supporting said deck upon an arch portion of each of said arched cross frames and each of said outrigger skis being provided with height adjustment means for varying the height of said outrigger skis with respect to said main ski.

* * * * *